May 13, 1941.　　　C. H. KÖHN　　　2,241,820
ROLLER CHAIN
Filed July 19, 1940
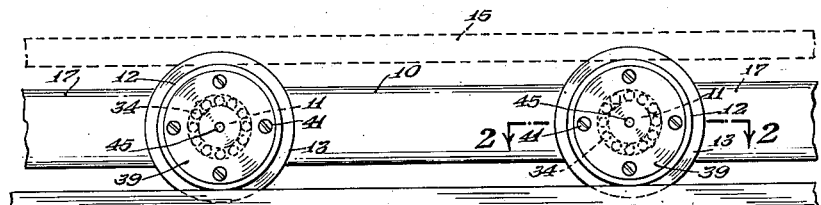
FIG. 1
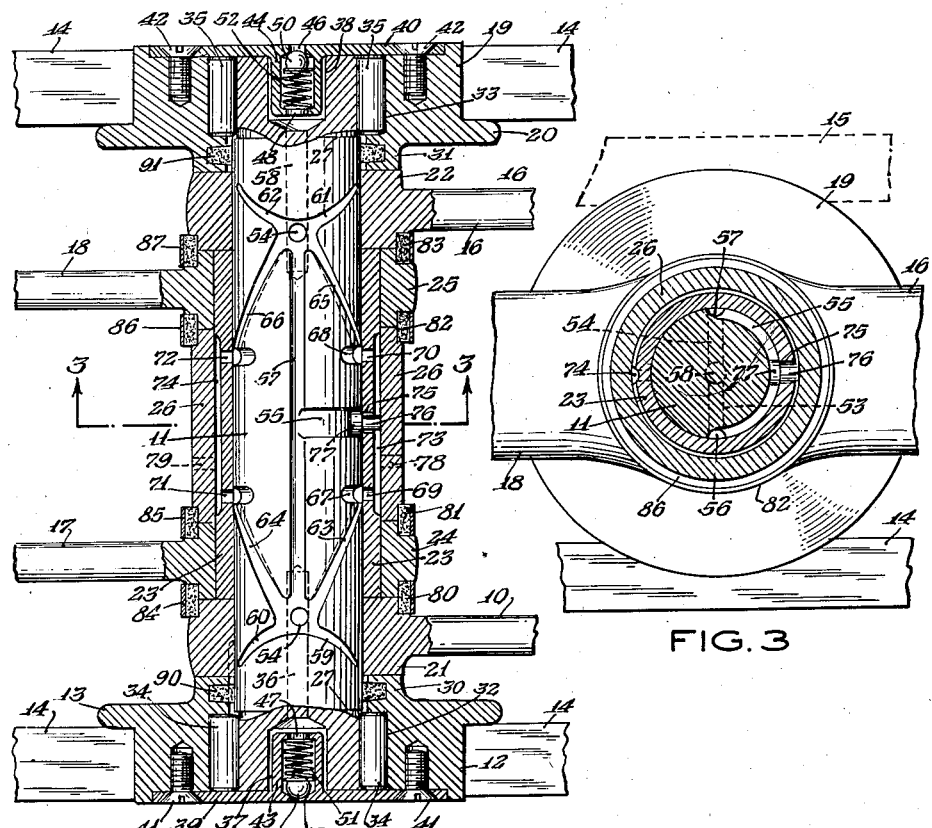
FIG. 2
FIG. 3
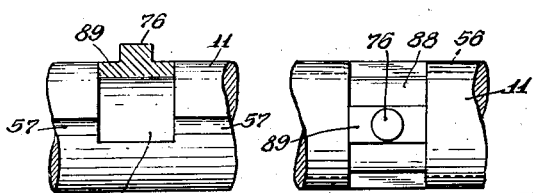
FIG. 4　　FIG. 5
INVENTOR.
CLAUS HINRICH KÖHN
BY
ATTORNEY.

Patented May 13, 1941

2,241,820

UNITED STATES PATENT OFFICE 2,241,820

ROLLER CHAIN

Claus Hinrich Köhn, Rapperswil, St. Gallen, Switzerland, assignor to Karl Seiler, Zurich, Switzerland Application July 19, 1940, Serial No. 346,248
In France April 22, 1940

5 Claims. (Cl. 74—257)

This invention relates to roller chains, in particular chains which are supported by rollers running on rails or tracks.

Chains of this type are used for many purposes, such as to connect or support the elements of endless caterpillar belts, for driving and supporting the elements of endless conveyor belts, and for many other purposes.

Rails or guiding surfaces for the rollers of the chain are provided either on one side or on opposite sides of these rollers; the latter is usually the case where the chain is to be guided in curves.

Permanent lubrication of the places where the links of the chain are journalled on the bolts which are supported by the rollers is difficult, particularly when the chain is in continuous operation.

It is therefore an object of the invention to provide lubrication for such places of the bolts which is effective over a long period of use or uninterrupted run of the chain.

It is another object of the invention to provide lubrication under intermittently or recurrently applied pressure for those places.

It is still another object of the invention to secure automatic distribution of the lubricating material, such as viscous oil or grease, to those places of each bolt by and during the operation of the chain.

It is still another object of the invention to provide a simple and efficient structure of self-lubricating bolts and their connection with the links of the chain and the bearings of the rollers, which can be easily manufactured in mass production and assembled without difficulty.

These and other objects of the invention will be more clearly understood as the specification proceeds with reference to the drawing, in which Fig. 1 shows more diagrammatically a roller chain running on a rail or guide, Fig. 2 a horizontal cross section, partly in elevation, through a joint of the chain along lines II—II in Fig. 1, Fig. 3 a cross section along line III—III in Fig. 2, Fig. 4 a side view of the center part of the bolt, and Fig. 5 a top view upon the center part of the bolt showing a modification of the invention.

The roller chain to which the invention pertains consists of alternating links 10, 17, Fig. 1, usually arranged in pairs and journalled on bolts 11, over the projecting ends of which rollers 12 provided with tyres or flanges 13 are slipped. The rollers 12 run on rails 14 supporting the roller from below; sometimes, and usually in curves through which the chain is to run, rails 15 (shown in dotted lines) are arranged on the upper side of the wheels in such distance from rails 14 that only either one can be contacted by the rollers 12.

Fig. 2 illustrates a connection of alternating pairs of links 10, 16 and 17, 18 with a bolt 11 which is supported by rollers 12, 19 having tyres or flanges 13, 20. Links 10, 16 are provided with lugs 21, 22, respectively, journalled on bolt 11 and kept in desired distance from each other by sleeve 23. Links 17, 18 are provided with lugs 24, 25, respectively, journalled on sleeve 23 and kept in desired distance from each other by sleeve 26.

If a roller chain is concerned driven by a cogged wheel or other means engaging successive bolts between pairs of links 17, 18, sleeves 26 also serve as protecting covers for the bolts and rotate around them while engaged by the teeth of a driving wheel.

Bolt 11 is provided with shoulders 27 on both sides and continued by pivots or trunnions 28, 29 of smaller diameter than the main portion of the bolt between shoulders 27, 27. The rollers 12, 19 are provided on the inside with collars or rings 30, 31 spacedly surrounding the ends of bolt 11 adjacent to shoulders 27, and with cylindrical recesses 32, 33 forming a runway for rollers 34, 35 arranged within the annular space between the runway and the cylindrical outer surface of the trunnions or pivots 28, 29, respectively. The rails 14 (shown in dotted lines) engage the rollers 12, 19 and flanges 13, 20, thus supporting the rollers and keeping them in their position on the trunnions 28, 29, respectively.

In order to permit lubrication of a joint of the chain, as illustrated in Figs. 2 and 3, bolt 11 is provided with axial bores or channels 36, 58 ending in enlarged preferably cylindrical bores 37, 38 which open in the front faces of bolt 11. Circular plates 39, 40 are inserted into recesses in the outer front sides of rollers 12, 19 and held in position by screws 41, 42. At the center of the plates hollow boxes 43, 44 are arranged having apertures 45, 46 on the outside and apertures 47, 48 on the inside; apertures 47, 48 are in alignment with the open ends of the axial bores 36, 58, respectively, of bolt 11. In each of the boxes balls 49, 50 or plugs are inserted capable to tightly close the apertures 45, 46, respectively. Apertures 45, 46 are considerably smaller than apertures 47, 48 so that the balls 49, 50 can be conveniently inserted into the boxes 43, 44 through apertures 47, 48 and held pressed against the inside of apertures 45, 46, respectively, by means of coil springs or the like 51, 52. After the balls and springs have been inserted into the boxes plates 39, 40 are screwed onto rollers 12, 19. The rollers 34, 35 are arranged around the trunnions 28, 29 before the rollers 12, 19 provided with their front plates are slipped over the trunnions and rollers 34, 35.

Pairs of radially outwardly extending channels or bores 53, 54 inclined towards each other by an angle of about 60° to 180° are connected and in open communication with the inner ends of bores or channels 36, 58 and also in open communication with axially extending lubrication grooves 56, 57 in the circumference of bolt 11; grooves 56, 57 also communicate with a ring groove 55 covering about half of the circumference of bolt 11 at its center. Other curved lubrication grooves 59, 60 and 61, 62 extend from the outer ends of bores 53, 54 close to the places where collars 30, 31 of rollers 12, 19 are slipped over the ends of bolt 11, and further curved lubrication grooves 63, 64 and 65, 66 extend to and communicate with shorter ring grooves 67, 68.

It is to be understood that all the lubrication grooves 59 to 68 are arranged symmetrically on both sides of bolt 11.

Bores 69, 70 and 71, 72 cross sleeve 23 on opposite sides and are in open communication with axially extending lubrication grooves 73, 74, respectively, on the outside of sleeve 23.

Another hole 75 is provided in sleeve 23 and a pin or other suitable member 76 arranged therein with clearance so as to leave sufficient space for a lubricant to flow through bore 75 as will be explained further hereafter. Member 76 is rigidly connected with displacing member 77 which is slidably arranged and fits as completely as possible into groove 55.

In operation, a lubricant, such as viscous oil, admixed with graphite, if desired, or grease, is injected into boxes 43, 44 through apertures 45, 46. To this effect the tip of a lubricating gun is pushed through the apertures 45, 46, which pushes back the balls 49, 50 and permits the lubricant to be pressed through apertures 47, 48 into the bores 36, 58, and through channels 53, 54 into the lubricating grooves 55 to 66, and through holes 69 to 72 also into grooves 73, 74.

After all the communicating bores and lubricating grooves of and on bolt 11 and sleeve 23 are thus entirely filled with grease, the gun is withdrawn and apertures 45, 46 automatically closed by balls 49, 50.

When the chain runs through curves, the pairs of links 10, 16 and 17, 18 are turned relative to each other and bolt 11 and sleeve 23, respectively, and sleeve 23 held between lugs 21, 22 of links 10, 16 is taken along by the latter and rotated around bolt 11 on which lugs 21, 22 are journalled. By this rotation of sleeve 23 relative to bolt 11, member 76 in sleeve 23 is taken along and member 77 moved to one side or the other within groove 55 of bolt 11.

As soon as the links of the chain are straightened out again or turned relative to each other in opposite direction, sleeve 23 istaken back to its original relative position to bolt 11 or even rotated further to the opposite side, taking along and shifting member 77 in groove 55. Thus the grease in groove 55 is pressed by member 77, which operates like a piston moving in that groove, in one direction or another and thereby also the grease in the lubrication grooves communicating with groove 55. Thus repeated and recurring automatic movement of the grease or lubricant in all lubrication grooves is accomplished whereby a permanent lubrication under pressure of the contacting surfaces of bolt 11 and sleeve 23 is secured. Furthermore, the lubricant is also pressed into grooves 73, 74 and moved therethrough so that the contacting surfaces between sleeves 26 and 23 are permanently lubricated. It will be appreciated that sleeve 26 rotates around sleeve 23, when the former engages the teeth or other elements of a driving member, such as a cogged driving wheel whereby wear and resistance against motion are reduced to a minimum.

According to experience the chain is bent and thereby adjacent pairs of links are turned relative to each other from their straightened out position by not more than about 30° when the chain passes curves of the rails or over the cogged driving wheel. Consequently, member 77 is moved in groove 55 to the left or right from its position shown in Fig. 3 by an angle of not more than about 30°. Therefore groove 55 has to extend over such a part of the circumference of bolt 11 that member 77 can move within the groove to one side or the other for a minimum angle corresponding to that expected when the chain is bent. Equally the places where channels 53, 54 communicate with groove 55 should be positioned so that member 77 does not cover them when it is moved in groove 55 in the way described above.

It will be appreciated that the amount of grease moved and pressed to one side or the other by member 77 largely depends upon the size of groove 55. In order to increase the amount of grease, either the number of grooves 55 each provided with a member 77 may be increased, or the size of groove 55 enlarged. While the former can be understood by anyone skilled in the art, Figs. 4 and 5 show an arrangement in which a larger ring groove extending over about half the circumference of the bolt is shown. There a ring groove 88 of rectangular cross section is shown which on both ends communicates with axial grooves 57. A displacing element 89 of rectangular cross section fitting into groove 88 as completely as possible is connected with a member 76 which engages hole 75 of sleeve 23. It will be appreciated that in this way the amount of grease moved and pressed by the displacing member 89 is considerably larger than the amount contained and controlled in groove 55.

The recesses 32, 33 of the rollers 12, 19 are suitably filled with grease for lubrication of rollers 34, 35. Loss of grease is prevented by packings 90, 91 disposed in circular recesses of rings 30, 31. If desired, filling-in openings (not shown) may be provided in plates 39, 40 for injecting grease into the space around trunnions 28, 29. Although some communication could be arranged between the lubrication grooves 59, 60, and 61, 62, and the space surrounding trunnions 28, 29, so that grease is also pressed into those spaces by action of member 77, experience has shown that sufficient lubrication of the rollers 12, 19 resolving around the trunnions is secured in the way described above.

It will be also appreciated that mounting of the rollers 12, 19 and their replacement is easy and that no additional means are needed for keeping them in position.

Thus according to the invention in the joints of a roller chain a system of axial and radial channels for introducing a lubricant as well as of communicating lubrication grooves is organized in which by the inevitable rotation of sleeve 23 relative to bolt 11 the lubricant is recurrently subjected to pressure and moved.

In assembling the joints, care has to be taken that member 77 in the straightened out position of the links lies about in the center of groove 55, as shown in Fig. 3. It does not matter whether sleeve 23 and bolt 11 always return exactly to their initial position shown, because the relative movement of them and thereby of member 77 in ring groove 55 is inevitable when the chain is bent or straightened out and results in pressure upon the lubricant and its movement through the communicating system of lubrication grooves and bores or channels.

It should also be understood that bores 69 to 72 may be omitted, if desired, since sleeve 25 rotates always relative to sleeve 23 in the same direction when it engages the cogged driving wheel, and satisfactory distribution of the lubricant injected into grooves 73, 74 through lubrication openings, such as 79, indicated in dotted lines, can be accomplished. In that case grooves 77, 78 may be omitted, as shown in dotted lines for the lower part of bolt 11 in Fig. 2.

In order to prevent loss of grease through the junctures between lugs 21, 24 and 25, 22, bandages 80, 81, 82 and 83 of fabric, leather or the like are suitably provided on the outside of these junctures, preferably seated in recesses and held by means of springy covers 84, 85, 86, 87 applied thereto from the outside.

It is to be understood that the invention is not limited to the exemplifications explained above and shown in the drawing but to be derived in its broadest aspect from the appended claims.

What I claim is:

1. A roller chain, comprising joints in which a first and second pair of links are attached to a common bolt provided with protruding ends on which supporting rollers are journalled, the links of said first pair being spacedly journalled on said bolt, a sleeve journalled on said bolt between the links of said first pair for keeping them in distance, the links of said second pair being journalled on said sleeve, bores extending from the front sides of said bolt to its inside, channels communicating with the spaced ends of said bores and extending to the surface of said bolt, a system of communicating lubrication grooves arranged on said bolt, certain of said grooves communicating with said channels, a number, one as a minimum, of grooves of said system substantially arranged as ring grooves in a radial plane of said bolt and connecting said certain grooves, a displacing member slidably arranged in and fitting each of said ring grooves and fixedly connected with said sleeve.

2. A roller chain comprising joints in which a first and second pair of links are attached to a common bolt provided with protruding ends on which supporting rollers are journalled, the links of said first pair being spacedly journalled on said bolt, a first sleeve journalled on said bolt between the links of said first pair for keeping them in distance, the links of said second pair being journalled on said first sleeve, a second sleeve journalled on said first sleeve between the links of said second pair and keeping them in distance, said bolt being provided with a shoulder on both sides outside the places where said first pair of links is journalled thereon and with projecting trunnions on which a supporting roller each is journalled, axial bores extending from the front sides of said bolt to its inside, channels communicating with the spaced ends of said bores and extending radially outward, a system of communicating lubrication grooves arranged on said bolt, axial grooves of said system arranged on opposite sides of said bolt and communicating with said channels, a number, one as a minimum, of grooves of said system substantially arranged as ring grooves in radial planes of said bolt and extending from one of said axial grooves to the other, a displacing member slidably arranged in and fitting each of said ring grooves, and a projecting member connected therewith engaging a hole in said first sleeve.

3. A roller chain comprising joints in which a first and second pair of links are attached to a common bolt provided with protruding ends on which supporting rollers are journalled, the links of said first pair being spacedly journalled on said bolt, a first sleeve journalled on said bolt between the links of said first pair for keeping them in distance, the links of said second pair being journalled on said first sleeve, a second sleeve journalled on said first sleeve between the links of said second pair for keeping them in distance, axial bores extending from the front sides of said bolt to its inside, channels communicating with the spaced ends of said bores and extending substantially radially outward, a system of communicating lubrication grooves arranged on said bolt, certain of said grooves communicating with said channels, a number, one as a minimum, of grooves of said system substantially arranged as ring grooves in radial planes of said bolt and connecting said certain grooves, a displacement member slidably arranged in and fitting each of said ring grooves, lubrication grooves on the outside of said first sleeve facing said second sleeve, channels passing through said first sleeve communicating with said grooves on its outside and ending at its inside in front of a ring groove each of said system, and a projecting part of said displacing member engaging one of said channels in said first sleeve.

4. A roller chain comprising joints in which a first and second pair of links are attached to a common bolt provided with protruding ends forming trunnions on which supporting rollers are journalled by the intermediary of rollers, the links of said first pair being spacedly journalled on said bolt between said trunnions, a first sleeve journalled on said bolt between the links of said first pair for keeping them in distance, the links of said second pair being journalled on said first sleeve, a second sleeve journalled on said first sleeve between the links of said second pair for keeping them in distance, spaced axial bores extending from the inside of said bolt through said trunnions to their outside and being enlarged within said trunnions, pairs of channels inclined towards each other by a minimum angle of 60 degrees, one pair each communicating with an inner end of one of said bores and extending substantially radially outward, a system of communicating lubrication grooves arranged on said bolt and extending substantially all over its axial length between said trunnions, certain grooves of said system communicating with said channels, a number, one as a minimum, of grooves of said system substantially arranged as ring grooves in radial planes of said bolt and extending between said certain grooves, a displacing member slidably arranged in and fitting each of said grooves and connected with said first sleeve, and supporting rollers slipped over said trunnions and provided with lubrication boxes substantially fitting the enlarged portion of and communicating with said axial bores.

5. A roller chain comprising joints in which a first and second pair of links are attached to a common bolt provided with protruding ends forming trunnions on which supporting rollers are journalled by the intermediary of rollers, the links of said first pair being spacedly journalled on said bolt, a first sleeve journalled on said bolt and engaging slidably the links of said first pair, the links of said second pair being journalled on said first sleeve, a second sleeve journalled on said first sleeve between and slidably engaging the links of said second pair, substantially spaced axial bores extending from the inside of said bolt through said trunnions to their outside, pairs of channels inclined by a minimum of 60 degrees, each pair communicating with an inner end of one of said bores and extending substantially radially outward, a system of communicating lubrication grooves arranged on and extending over said bolt between said trunnions, certain grooves of said system communicating with said channels, a number, one as a minimum, of grooves of said system arranged as ring grooves in substantially radial planes of said bolt and extending between said certain grooves, a displacing member slidably arranged in and fitting each of said ring grooves and connected with said first sleeve, supporting rollers having flanges slipped over said trunnions and slidably and tightly engaging adjacent portions of said bolt, a lubrication box having an opening on the outside to receive a lubricant arranged in each supporting roller and slidably engaging and communicating with the outer end of an axial bore of said bolt, and bandages slidably arranged in front of and outside the junctures between said second sleeve and the links of said second pair and between the links of said second and first pair.

CLAUS HINRICH KÖHN.